US011995530B2

(12) United States Patent
Donsbach et al.

(10) Patent No.: US 11,995,530 B2
(45) Date of Patent: *May 28, 2024

(54) SYSTEMS AND METHODS FOR PROVIDING FEEDBACK FOR ARTIFICIAL INTELLIGENCE-BASED IMAGE CAPTURE DEVICES

(71) Applicant: Google LLC, Mountain View, CA (US)

(72) Inventors: Aaron Michael Donsbach, Seattle, WA (US); Christopher Breithaupt, Berkeley, CA (US); Li Zhang, Seattle, WA (US); Arushan Rajasekaram, Seattle, WA (US); Navid Shiee, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,724

(22) Filed: Aug. 1, 2022

(65) Prior Publication Data

US 2022/0366219 A1 Nov. 17, 2022

Related U.S. Application Data

(63) Continuation of application No. 17/266,957, filed as application No. PCT/US2019/014481 on Jan. 22, 2019, now Pat. No. 11,403,509.

(Continued)

(51) Int. Cl.
*G06N 3/044* (2023.01)
*G06N 3/045* (2023.01)
(Continued)

(52) U.S. Cl.
CPC ............ *G06N 3/044* (2023.01); *G06N 3/045* (2023.01); *G06N 3/084* (2013.01);
(Continued)

(58) Field of Classification Search
CPC ........ G06N 3/044; G06N 3/045; G06N 3/084; G06N 3/082; H04N 23/611; H04N 23/62; H04N 23/632; H04N 23/64; H04N 23/633
See application file for complete search history.

(56) References Cited

U.S. PATENT DOCUMENTS

| 9,282,238 B2 | 3/2016 | Staudacher et al. |
| 10,147,216 B1 * | 12/2018 | Miao ........................ G06T 7/194 |

(Continued)

FOREIGN PATENT DOCUMENTS

| CN | 107111491 | 8/2017 |
| KR | 2008/0012231 | 2/2008 |
| WO | WO 2017/177259 | 10/2017 |

OTHER PUBLICATIONS

Chinese Search Report Corresponding to Application No. 2019800536062 dated Jun. 14, 2022.

(Continued)

*Primary Examiner* — Ahmed A Berhan
(74) *Attorney, Agent, or Firm* — DORITY & MANNING P.A.

(57) ABSTRACT

The present disclosure provides systems and methods that provide feedback to a user of an image capture device that includes an artificial intelligence system that analyzes incoming image frames to, for example, determine whether to automatically capture and store the incoming frames. An example system can also, in the viewfinder portion of a user interface presented on a display, a graphical intelligence feedback indicator in association with a live video stream. The graphical intelligence feedback indicator can graphically indicate, for each of a plurality of image frames as such image frame is presented within the viewfinder portion of the user interface, a respective measure of one or more attributes of the respective scene depicted by the image frame output by the artificial intelligence system.

20 Claims, 11 Drawing Sheets

Related U.S. Application Data

(60) Provisional application No. 62/742,810, filed on Oct. 8, 2018.

(51) Int. Cl.
| | |
|---|---|
| *G06N 3/048* | (2023.01) |
| *G06N 3/084* | (2023.01) |
| *H04N 23/60* | (2023.01) |
| *H04N 23/611* | (2023.01) |
| *H04N 23/62* | (2023.01) |
| *H04N 23/63* | (2023.01) |

(52) U.S. Cl.
CPC ........... *H04N 23/611* (2023.01); *H04N 23/62* (2023.01); *H04N 23/632* (2023.01); *H04N 23/64* (2023.01)

(56) References Cited

U.S. PATENT DOCUMENTS

| | | | |
|---|---|---|---|
| 2002/0171747 A1* | 11/2002 | Niikawa | H04N 23/633 348/333.01 |
| 2015/0288874 A1 | 10/2015 | Sivan | |
| 2015/0302029 A1* | 10/2015 | Miyashita | G06F 16/58 348/222.1 |
| 2017/0155833 A1* | 6/2017 | Rodrigo Cavalin | G06F 16/583 |
| 2018/0160036 A1 | 6/2018 | Chenny et al. | |
| 2018/0196587 A1 | 7/2018 | Bialynicka-Birula et al. | |

OTHER PUBLICATIONS

International Preliminary Report on Patentability for Application No. PCT/US2019/014481, dated Apr. 22, 2021, 10 pages.
International Search Report for PCT/US2019/014481, dated Aug. 13, 2019, 4 pages.

\* cited by examiner

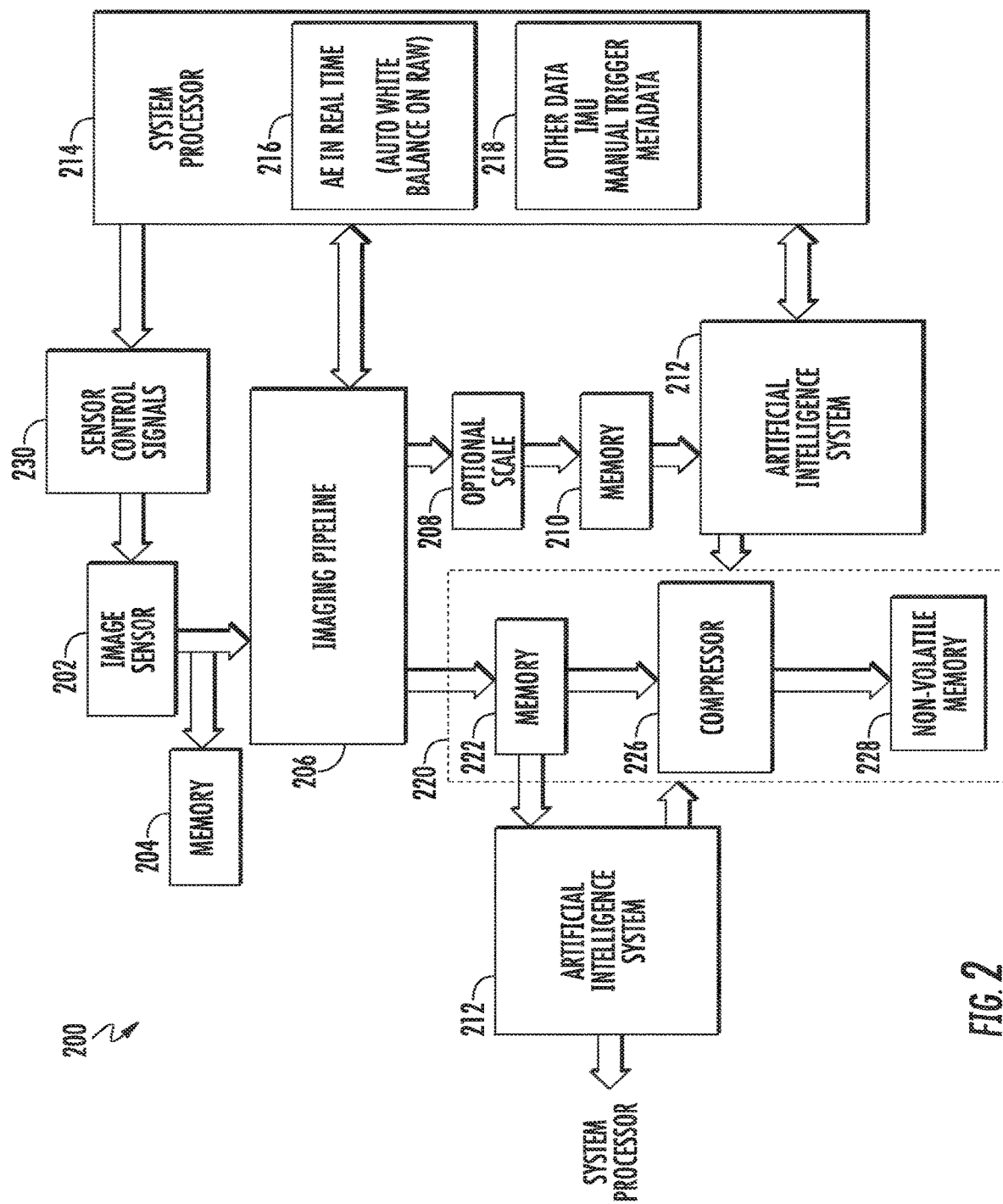

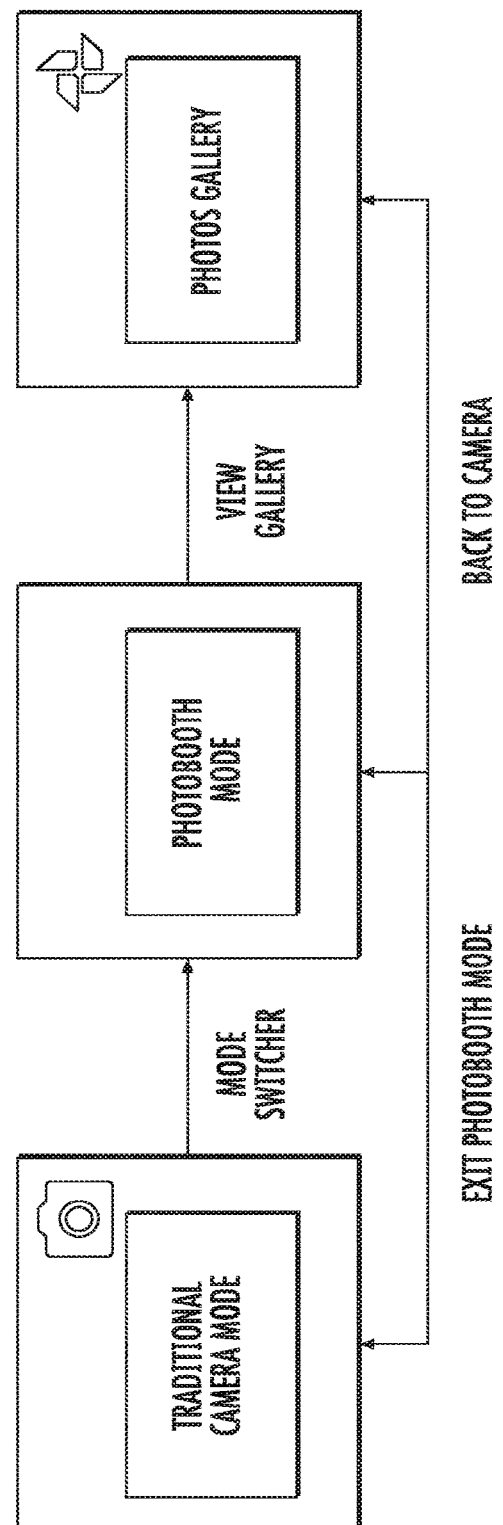

SYSTEMS AND METHODS FOR PROVIDING FEEDBACK FOR ARTIFICIAL INTELLIGENCE-BASED IMAGE CAPTURE DEVICES

PRIORITY CLAIM

The present application is a continuation of U.S. application Ser. No. 17/266,957 having a filing date of Feb. 8, 2021, which is based upon and claims the right of priority under 35 U.S.C. 371 to International Application No. PCT/US2019/014481 filed on Jan. 22, 2019, which claims the benefit of U.S. Provisional Patent Application No. 62/742,810, filed Oct. 8, 2018. Applicant claims priority to and the benefit of each of such applications and incorporates all such applications herein by reference in their entirety.

FIELD

The present disclosure relates generally to systems and methods for capturing images. More particularly, the present disclosure relates to systems and methods that provide feedback to a user of an image capture device based on an output of an artificial intelligence system that analyzes incoming image frames to, for example, measure attributes of the incoming frames and/or determine whether to automatically capture the incoming frames.

BACKGROUND

More and more individuals are using computing devices to capture, store, share, and interact with visual content such as photographs and videos. In particular, for some individuals, handheld computing devices, such as a smartphones or tablets, are the primary devices used to capture visual content, such as photographs and videos.

Some example types of photographs that users often capture are self-portrait photographs and group portrait photographs. In self-portrait photographs, a user typically holds her image capture device (e.g., smartphone with camera) such that a front-facing camera captures imagery of the user, who is facing the device. The user can also typically view the current field of view of the camera on a front-facing display screen to determine the attributes and quality of the image that is available to be captured. The user can press a shutter button capture the image. However, this scenario requires the user to operate the camera shutter while also attempting to pose for the photograph. Performing both of these tasks simultaneously can be challenging and can detract from the enjoyment or success of taking the self-portrait photograph. It can in particular be challenging for the user to perform these tasks whilst also assessing the attributes of the image that will be captured when the shutter is operated. This can result in the captured image having suboptimal lighting effects and/or other undesirable image properties.

In a group portrait photograph, a group of people typically pose for an image together. Historically, group portrait photographs have required one member of the party to operate the camera from a position behind the camera. This results in exclusion of the photographer from the photograph, which is an unsatisfactory result for both the photographer and the group that wishes for the photographer to join them. One attempted solution to this issue is the use of delayed timer-based capture techniques. However, in delayed timer-based capture techniques, a user is often required to place the camera in a certain location and then quickly join the group pose before the timer expires, which is a challenging action to take for many people or in many scenarios. Furthermore, photographs captured on a timer can have suboptimal lighting effects and/or other undesirable image properties due, at least in part, to the viewfinder of the camera not being used in an effective manner (the user having been required to leave the camera to join the shot) at the time of image capture. Furthermore, photographs captured on a timer often fail to have all persons in the group looking at the camera, as certain persons may lose focus while the timer runs or may be unaware that the timer is set to expire. Group self-portraits, which are a mixture of the two photograph types described above, often suffer from the same or similar problems.

SUMMARY

Aspects and advantages of the present disclosure will be set forth in part in the following description, or may be obvious from the description, or may be learned through practice of embodiments of the present disclosure.

One example aspect of the present disclosure is directed to a computing system. The computing system includes an image capture system configured to capture a plurality of image frames. The computing system includes an artificial intelligence system comprising one or more machine-learned models. The artificial intelligence system is configured to analyze each of the plurality of image frames and to output, for each of the plurality of image frames, a respective measure of one or more attributes of a respective scene depicted by the image frame. The computing system includes a display. The computing system includes one or more processors and one or more non-transitory computer-readable media that store instructions that, when executed by the one or more processors, cause the one or more processors to perform operations. The operations include providing, in a viewfinder portion of a user interface presented on the display, a live video stream that depicts at least a portion of a current field of view of the image capture system. The live video stream includes the plurality of image frames. The operations include providing, in the viewfinder portion of the user interface presented on the display, a graphical intelligence feedback indicator in association with the live video stream. The graphical intelligence feedback indicator graphically indicates, for each of the plurality of image frames as such image frame is presented within the viewfinder portion of the user interface, the respective measure of the one or more attributes of the respective scene depicted by the image frame output by the artificial intelligence system.

Another example aspect of the present disclosure is directed to a computer-implemented method. The method includes obtaining, by one or more computing devices, a real-time image stream comprising a plurality of image frames. The method includes analyzing, by the one or more computing devices using one or more machine-learned models, each of the plurality of image frames to determine a respective image quality indicator that describes whether content depicted in the respective image frame satisfies a photographic goal. The method includes providing, by the one or more computing devices, a feedback indicator for display in association with the real-time image stream in a user interface, wherein the feedback indicator indicates the respective image quality indicator for each image frame while such image frame is presented in the user interface.

Another example aspect of the present disclosure is directed to a computing system. The computing system includes an image capture system configured to capture a plurality of image frames. The computing system includes an artificial intelligence system comprising one or more machine-learned models. The artificial intelligence system is configured to analyze each of the plurality of image frames and to output, for each of the plurality of image frames, a respective measure of one or more attributes of a respective scene depicted by the image frame. The computing system includes a display. The computing system includes one or more processors and one or more non-transitory computer-readable media that store instructions that, when executed by the one or more processors, cause the one or more processors to perform operations. The operations include providing, in a viewfinder portion of a user interface presented on the display, a live video stream that depicts at least a portion of a current field of view of the image capture system. The live video stream includes the plurality of image frames. The operations include providing an intelligence feedback indicator in association with the live video stream, the intelligence feedback indicator indicating, for each of the plurality of image frames as such image frame is presented within the viewfinder portion of the user interface, the respective measure of the one or more attributes of the respective scene depicted by the image frame output by the artificial intelligence system.

Other aspects of the present disclosure are directed to various systems, apparatuses, non-transitory computer-readable media, user interfaces, and electronic devices.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

Detailed discussion of embodiments directed to one of ordinary skill in the art is set forth in the specification, which makes reference to the appended figures, in which:

FIG. 2 depicts a diagram of an example component arrangement according to example embodiments of the present disclosure.

FIG. 4 depicts a diagram of an example operational state flow according to example embodiments of the present disclosure.

Figure 1A:
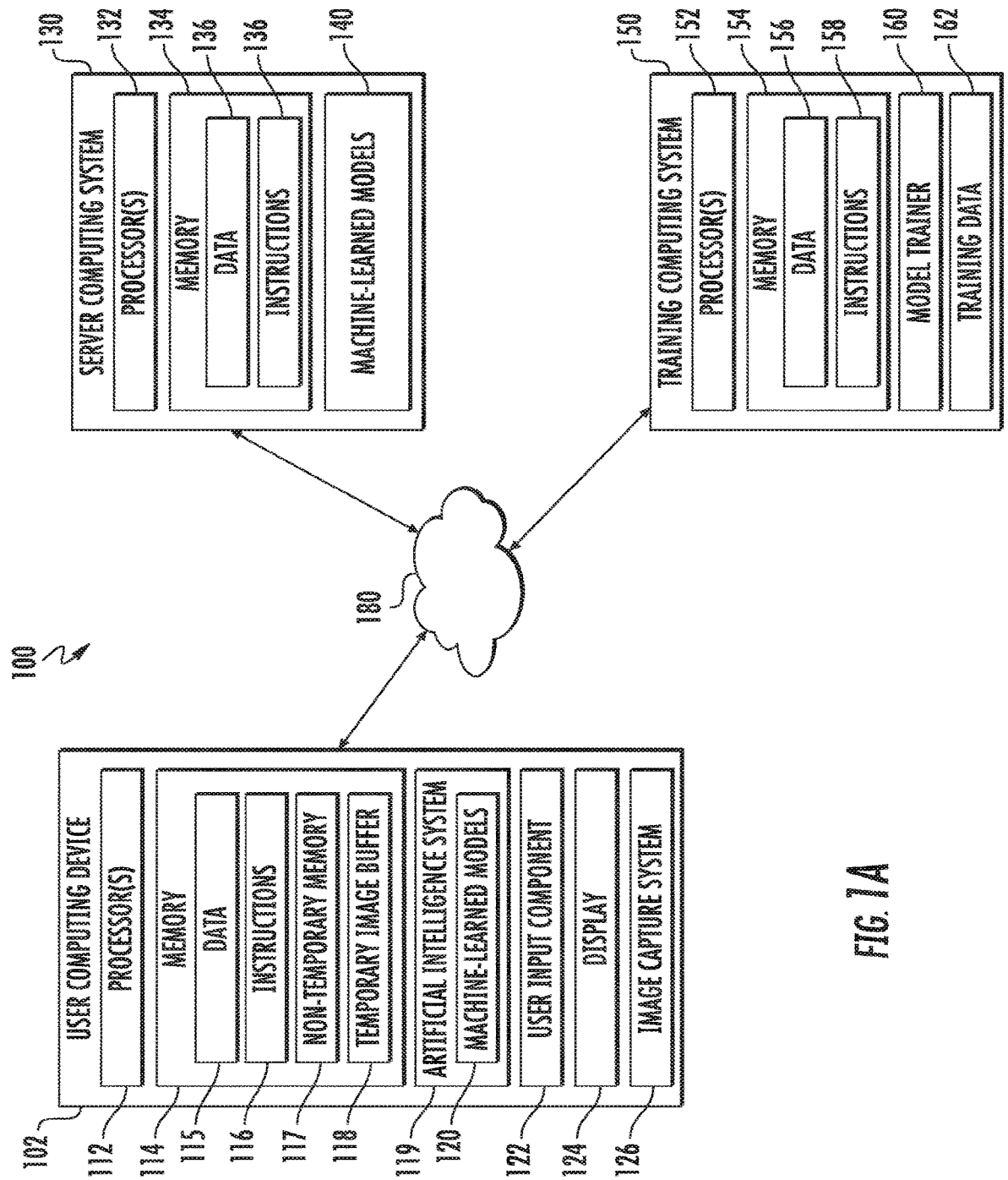
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods that provide feedback to a user of an image capture device that includes an artificial intelligence system that analyzes incoming image frames to, for example, determine whether to automatically capture and store the incoming frames. In particular, one example device or computing system (e.g., a smartphone) can include an image capture system configured to capture a plurality of image frames and an artificial intelligence system configured to analyze each of the plurality of image frames and output, for each of the plurality of image frames, a respective measure of one or more attributes of a respective scene, such as lighting, depicted by the image frame. For example, the artificial intelligence system can output a score or other measure of how desirable a particular image frame is for satisfying a particular photographic goal, such as, for example, a self-portrait photograph, a group portrait photograph, and/or a group self-portrait photograph. In some implementations, the artificial intelligence system can also be configured to automatically select certain images based for storage on their respective measures generated by the artificial intelligence system. The example system can provide, in a viewfinder portion of a user interface presented on a display, a live video stream that depicts at least a portion of a current field of view of the image capture system. In particular, the live video stream can include the plurality of image frames. According to an aspect of the present disclosure, the example system can also provide, in the viewfinder portion of the user interface presented on the display, a graphical intelligence feedback indicator in association with the live video stream. The graphical intelligence feedback indicator can graphically indicate, for each of the plurality of image frames as such image frame is presented within the viewfinder portion of the user interface, the respective measure of the one or more attributes of the respective scene depicted by the image frame output by the artificial intelligence system. Thus, in some implementations, as the image frames are shown on the display in real-time, the graphical intelligence feedback indicator can indicate or be representative of the score or other measure of how desirable the currently shown image frame is for satisfying a particular photographic goal, such as, for example, a self-portrait photograph, a group portrait photograph, and/or a group self-portrait photograph. In particular, in some implementations, the feedback indicator can be viewed as a meter that indicates a proximity of the artificial intelligence system to automatic capture and non-temporary storage of imagery (e.g., how close the image frame is to satisfying criteria for automatic capture and storage). In such fashion, the user can be presented with real-time feedback that informs the user of what, when, and why automatic capture decisions are made by the artificial intelligence systems, which can enable users to participate in a collaborative image capture process.

Thus, through the use of an artificial intelligence system to select the best shots and perform the shutter work, aspects of the present disclosure help users to capture and store images that best satisfy their photographic goals (e.g., self-portraits, group portraits, landscape photography, traditional portraits, action scenes, or other photographic goals). In addition, the systems and methods of the present disclosure can provide real-time feedback that indicates a measure generated by the artificial intelligence system of one or more attributes of the currently displayed view. As examples, the measured attributes can include lighting in the image frame, the color of the image frame, the presence and/or number of front facing faces, posing faces, faces with smiling facial expressions, faces with unusual facial expressions, faces with eyes open, and/or faces with frontal gaze. In particular, aspects of the present disclosure enable a continued and guided human-machine interaction, through which the user is provided feedback, via the feedback indicator, of attributes of the image frames in real-time. This knowledge of the attributes of the image frames, which may for example include lighting and/or color properties of the image frames, enables users to compose images with desired properties. As part of this, the user is able to step back and concentrate on posing for or otherwise composing the image, letting the intelligence system handle the shutter control in an intelligent and hands-free way. This also enables easier candid group shots by letting everyone get in the shot and capturing automatically and/or via remote triggers when everyone's looking their best.

Thus, a device can provide a feedback indicator that tells the user if and/or to what degree the artificial intelligence system finds attributes of the current view appropriate, desirable, or otherwise well-suited for a particular photographic goal such as a self or group portrait. In such fashion, the systems and methods of the present disclosure can enable the collaboration between the user and the artificial intelligence system by guiding a user-machine interaction to capture images that satisfy photographic goals. The user may for example be guided to change attributes of image frames being presented on the device, based on the real-time feedback, by moving to an area of the room with different lighting conditions.

More particularly, an example device or computing system (e.g., a smartphone) can include an image capture system configured to capture a plurality of image frames. As one example, the image capture system can include a forward-facing camera that faces in a same direction as the display. Although a smartphone with forward-facing camera is used as a common example herein, aspects of the present disclosure are equally applicable to many other devices, systems, and camera configurations, including, for example, rearward-facing cameras.

The device or computing system can present a user interface on a display. The user interface can include a viewfinder portion. The device or system can present a live video stream that depicts at least a portion of a current field of view of the image capture system in the viewfinder portion of the user interface. More particularly, the device can display incoming image frames as they are received from the image capture system to provide the user with an understanding of the current field of view of the image capture system. Thus, as the user moves the device or otherwise changes the scene (e.g., by moving to a part of a room with different lighting conditions or making a different facial expression), the user can be given a real-time view of the image capture system's field of view.

The device or computing system can also include an artificial intelligence system configured to analyze each of the plurality of image frames and output, for each of the plurality of image frames, a respective measure of one or more attributes of a respective scene depicted by the image frame. For example, the artificial intelligence system can output a score or other measure of how desirable a particular image frame is for satisfying a particular photographic goal, such as, for example, a self-portrait photograph, a group portrait photograph, or a group self-portrait photograph.

In some implementations, the artificial intelligence system can include one or more machine-learned models such as, for example, a machine-learned face detection model, a machine-learned pose detection model, and/or a machine-learned facial expression model. The artificial intelligence system can leverage the machine-learned models to determine the measure of the attribute(s) of the image. For example, in some implementations, the presence of one or more of the following in the respective scene results in an increase in the respective measure of the one or more attributes of the respective scene output by the artificial intelligence system: front facing faces; posing faces; faces with smiling facial expressions; and/or faces with unusual facial expressions.

In addition, according to an aspect of the present disclosure, the device or system can also provide, in the viewfinder portion of the user interface presented on the display, a graphical intelligence feedback indicator in association with the live video stream. The graphical intelligence feedback indicator can graphically indicate, for each of the plurality of image frames as such image frame is presented within the viewfinder portion of the user interface, the respective measure of the one or more attributes of the respective scene depicted by the image frame output by the artificial intelligence system. Thus, in some implementations, as the image frames are shown on the display in real-time, the graphical intelligence feedback indicator can indicate or be representative of the score or other measure of how desirable the currently shown image frame is for satisfying a particular photographic goal, such as, for example, a self-portrait photograph, a group portrait photograph, or a group self-portrait photograph. This feedback can continuously guide the interaction between the user and the system so as to allow a shot satisfying the photographic goal. The final shot may have, for example, particular lighting and/or color properties and/or include certain subject matter (e.g., smiling faces facing toward the camera).

Although portions of the present disclosure focus on graphical indicators, aspects of the present disclosure are equally applicable to other types of feedback indicators including an audio feedback indicator provided by a speaker (e.g., changes in tone or frequency indicate feedback), a haptic feedback indicator, an optical feedback indicator provided by a light emitter other than the display (e.g., changes in intensity or frequency of flash in light indicate feedback), and/or other types of indicators. Furthermore, although portions of the present disclosure focus on the photographic goals of self or group portraits, aspects of the present disclosure are equally applicable to other types of photographic goals, including, for example, landscape photography, traditional portraits, action scenes, architectural photography, fashion photography, or other photographic goals.

The graphical feedback indicators can take a number of different forms or styles and can operate in a number of different ways. As an example, in some implementations, the graphical intelligence feedback indicator can include a graphical bar that has a size that is positively correlated to and indicative of the respective measure of the one or more attributes of the respective scene depicted by the image frame currently presented in the viewfinder portion of the user interface. For example, the graphical bar can be a horizontal bar at a bottom edge or a top edge of the viewfinder portion of the user interface.

In some implementations, the graphical bar can have a center point and extend along a first axis. In some implementations, the graphical bar can be fixed or pinned at the center point of the graphical bar and can increase or decrease in size in both directions from the center point of the graphical bar along the first axis to indicate changes in the respective measure of the one or more attributes of the respective scene depicted by the image frame currently presented in the viewfinder portion of the user interface.

Thus, in one example, if the user is watching the viewfinder and the graphical bar, they may see the graphical bar grow or shrink as the scene becomes more or less desirable. For example, if the user turns his face away from the camera the bar may shrink while if the user turns his face towards the camera the bar may grow. Likewise, if the user frowns then the bar may shrink while if the user smiles then the bar may grow. In some implementations, when the bar hits the edge of the display, this may indicate that the device has decided to automatically capture a photograph. As described further below, this may also be accompanied with an automatic capture notification. Thus, the user can be given the sense that, as the bar grows, so does the likelihood that an image will be automatically captured.

In another example, in some implementations, the graphical intelligence feedback indicator can include a graphical shape (e.g., circle, triangle, rectangle, arrow, star, sphere, box, etc.). An amount of the graphical shape that is filled can be positively correlated to and indicative of the respective measure of the one or more attributes of the respective scene depicted by the image frame currently presented in the viewfinder portion of the user interface.

In one particular example, the graphical shape (e.g., circle) can have a center point. The amount of the graphical shape (e.g., circle) that is filled can increase and decrease radially from the center point of the shape toward a perimeter of the shape to indicate changes in the respective measure of the one or more attributes of the respective scene depicted by the image frame currently presented in the viewfinder portion of the user interface.

In some implementations, in addition or alternatively to the example feedback indicators described above, the graphical intelligence feedback indicator can include textual feedback (e.g., displayed in the viewfinder portion of the user interface). For example, the textual feedback can provide one or more suggestions to improve the measure of the one or more attributes of the respective scene. In some instances, the one or more suggestions can be generated by the artificial intelligence system or based on output of the artificial intelligence system.

In some implementations, the graphical intelligence feedback indicator can be viewed as or operate as a meter that indicates a proximity of the artificial intelligence system to automatic capture and non-temporary storage of imagery. For example, the feedback indicator can fill and/or increase in size to indicate how close the artificial intelligence system is approaching to automatically capturing and storing an image.

In some implementations, the graphical intelligence feedback indicator graphically indicates, for each image frame, a raw measure of the one or more attributes of the respective scene depicted by the image frame without reference to the measures of any other image frames. In other implementations, the graphical intelligence feedback indicator graphically indicates, for each image frame, a relative measure of the one or more attributes of the respective scene depicted by the image frame relative to the previous respective measures of the one or more attributes of respective image frames that have previously been presented within the viewfinder portion of the user interface. For example, the relative measure can be relative to images that have been captured during the current operational session of the device or system, during the current capture session, and/or since the last instance of automatic capture and storage. Thus, in some implementations, characteristics (e.g., size) of the graphical intelligence feedback indicator can be determined based on measures of attribute(s) of the current frame as well as a history of frames that have been seen and/or processed recently.

More particularly, as indicated above, in some implementations, the device or system can automatically store a non-temporary copy of at least one of the plurality of image frames based at least in part on the respective measure output by the artificial intelligence system of the one or more attributes of the respective scene depicted by the at least one of the plurality of image frames. For example, if the measure of the attribute(s) for a particular image frame satisfies one or more criteria, the device or system can store a copy of the image in a non-temporary memory location (e.g., flash memory or the like). In contrast, image frames that are not selected for storage can be discarded without non-temporary storage. For example, image frames can be placed in a temporary image buffer, analyzed by the artificial intelligence system, and then deleted from the temporary image buffer (e.g., on a first-in-first-out basis), such that only those images that were selected for non-temporary storage are retained following operation of the device and clearing of the buffer.

In some implementations, in response to automatically storing the non-temporary copy of at least one of the plurality of image frames, the device or system can provide an automatic capture notification (e.g., in the viewfinder portion of the user interface presented on the display). For example, the automatic capture notification can include a flash within the viewfinder portion of the user interface presented on the display. The automatic capture notification can indicate to the user that an image was captured (e.g., stored in a non-temporary memory location). This enables the user to understand the operation of the artificial intelligence system and to participate in the photoshoot process.

In some implementations, after automatically storing the non-temporary copy of at least one of the plurality of image frames, the device or system can operate in a refractory mode for a refractory period. In the refractory mode the computer system does not automatically store additional non-temporary copies of additional image frames regardless of the respective measure of the one or more attributes of the respective scene depicted by the additional image frames. Alternatively or additionally, in the refractory mode, the measure output but the artificial intelligence system and/or the graphical feedback indicator can be depressed to a lower level than such items would otherwise be if the device were not operating in the refractory mode. Operation in the refractory mode can avoid the situation where multiple, nearly identical frames are redundantly captured and stored. Operation in the refractory mode can also provide a natural "pause" that is reflected in the collaborative feedback from the device to the user, which can be a natural signal for the user to change poses and/or facial expressions, similar to behavior that occurs naturally when taking sequential photographs in a photoshoot.

In some implementations, the device or system can operate in a number of different operational modes and the auto-capture and/or feedback operations can be aspects of only a subset of such different operational modes. Thus, in some implementations, the device or system can receive a user input that requests operation of the computing system in a photobooth mode and, in response to the user input, operate in the photobooth mode, where providing, in the viewfinder portion of the user interface presented on the display, the graphical intelligence feedback indicator in association with the live video stream is performed as part of the photobooth mode. As an example, the device or system may be toggled between the photobooth mode and one or more other modes such as a traditional capture mode, a video mode, etc. Being a dedicated mode presents the user with an opportunity to choose to engage in temporary auto-capture. Alternatively, the device or system can always provide the auto-capture and/or feedback operations regardless of the current operational mode of the device or system.

The systems and methods of the present disclosure are applicable to a number of different use cases. As one example, the systems and methods of the present disclosure enable (e.g., via a guided interaction process between a user and a device) easier capture of group photos. In particular, in one illustrative example, a user can set down her smartphone, place the smartphone into an auto-capture mode, and let the smartphone operate like a photographer who knows just what to look for. As another example, the systems and methods of the present disclosure enable easier (e.g., via the same or a similar guided interaction process) capture of solo self-portraits. In particular, in one illustrative example, a user can hold up her smartphone to take a self-portrait to share on social media. Through the use of the auto-capture mode, the user can receive feedback regarding attributes of current image frames and focus on composing the image to be captured, for example by smiling and posing rather than operating the camera shutter. In effect, the user can turn her phone into a photobooth, have fun, and just pick out her favorites later. As yet another example, the systems and methods of the present disclosure enable easier capture of group self-portraits. In particular, in one illustrative example, instead of requiring a user to attempt to capture the image at exactly the right time when everyone is looking at the camera with their eyes open, the group can simply gather in front of the camera, receive feedback on the attributes of current image frames and interact with the artificial intelligence system, for example by changing position and/or facial expression based on the feedback, to cause the artificial intelligence system to capture images with particular attributes. In yet another example use case, the user can hold the camera device (e.g., smartphone) and point it at a subject (e.g., rearward-facing camera pointed at a subject other than the user). The user can let the intelligence handle the frame selection while the user is still responsible still for camera positioning, scene framing, and/or subject coaching.

In each of the example use cases described above, the smartphone can provide feedback during capture that indicates to the user or group of users how they can improve the likelihood of automatic image capture and also the quality of the captured images. In such fashion, the user(s) can be presented with real-time feedback that informs the user(s) of what, when, and why automatic capture decisions are made by the artificial intelligence systems, which can enable users to participate in a collaborative image capture process.

Through such collaborative process, the automatically captured images can capture the candid, fleeting, genuine facial expressions that only artificial intelligence is fast and observant enough to reliably capture.

The systems and methods of the present disclosure provide a number of technical effects and benefits. As one example, the systems and methods described herein can automatically capture images using minimal computational resources, which can result in faster and more efficient execution relative to capturing and storing a large number of images in non-temporary memory and then reviewing the stored image frames to identify those worth keeping. For example, in some implementations, the systems and methods described herein can be quickly and efficiently performed on a user computing device such as, for example, a smartphone because of the reduced computational demands. As such, aspects of the present disclosure can improve accessibility of image capture using such devices, for example, in scenarios in which cloud computing is unavailable or otherwise undesirable (e.g., for reasons of improving user privacy and/or reducing communication cost).

In this way, the systems and methods described herein can provide a more efficient operation of mobile image capture. By storing only the best, automatically selected images, the efficiency with which a particular image can be extracted and stored in non-temporary memory can be improved. In particular, the capture of brief and/or unpredictable events such as a laugh or smile can be improved. The systems and methods described herein thus avoid image capture operations which are less efficient, such as burst photography followed by manual culling.

In addition, through the use of feedback indicators, the user is able to more efficiently collaborate with the artificial intelligence system. In particular, the user is given a sense of what will result in automatic image capture and storage and can modify their behavior or other scene characteristics to more quickly achieve automatic capture and storage of images that suit the photographic goal. Thus, the use of feedback can result in the device or system obtaining high-quality results in less operational time, thereby saving operational resources such as processing power, battery usage, memory usage, and the like.

In various implementations, the systems and methods of the present disclosure can be included or otherwise employed within the context of an application, an application plug-in (e.g., browser plug-in), as a feature of an operating system, as a service via an application programming interface, or in other contexts. Thus, in some implementations, the machine-learned models described herein can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web image capture service).

With reference now to the Figures, example embodiments of the present disclosure will be discussed in further detail.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 115 and instructions 116 which are executed by the processor 112 to cause the user computing device 102 to perform operations.

The memory 114 can include a non-temporary memory location 117 and a temporary image buffer 118. For example, the temporary image buffer 118 can be a ring buffer. The temporary image buffer 118 can correspond with a non-transitory computer-readable storage medium that is suited for temporary storage of information, such as RAM, for example. For example, the temporary image buffer 118 can include volatile memory. The non-temporary memory location 117 may correspond with a non-transitory computer-readable storage medium that is suited for non-temporary storage of information, such as flash memory device, magnetics discs, etc. For example, the non-temporary memory location 117 can include non-volatile memory.

In some implementations, the user computing device can include an artificial intelligence system 119. The artificial intelligence system 119 can be configured to analyze each of a plurality of image frames and output, for each of the plurality of image frames, a respective measure of one or more attributes of a respective scene depicted by the image frame. For example, the artificial intelligence system 119 can output a score or other measure of how desirable a particular image frame is for satisfying a particular photographic goal, such as, for example, a self-portrait photograph, a group portrait photograph, or a group self-portrait photograph.

In some implementations, the artificial intelligence system 119 can be configured to capture content that features people and faces where subjects are in-focus and not blurry and/or subjects are smiling or expressing positive emotions. The artificial intelligence system 119 can avoid capturing subjects who have their eyes closed or are blinking.

Thus, in some implementations, the artificial intelligence system 119 can detect human faces in view and prioritize capture when faces are within 3-8 feet away and central to the camera's FOV (e.g., not within the outer 10% edge of view). In some implementations, the artificial intelligence system 119 can detect and prioritize capturing positive human emotions. For example, the artificial intelligence system 119 can detect smiling, laughter, and/or other expressions of joy, such as surprise, and contentment.

In some implementations, the artificial intelligence system 119 can detect human gaze and eyes to prioritize capture when subjects are looking at the camera and/or avoid blinks or closed eyes in selected motion photo poster frames. In some implementations, the artificial intelligence system 119 can detect and prioritize capturing clips when faces are known to be in-focus and properly exposed according to auto-focus/auto-exposure attributes defined by camera application APIs.

In some implementations, the artificial intelligence system 119 can prioritize capture when the is a reasonable confidence that the camera is set down or held stably (e.g., use IMU data to avoid delivering "shakycam" shots). In some implementations, the artificial intelligence system 119 can activity detection. In some implementations, the artificial intelligence system 119 can perform automatic cropping.

In some implementations, the artificial intelligence system 119 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIG. 3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform analysis of multiple images in parallel).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 102 can include a display 124. The display 124 can be any type of display including, for example, a cathode ray tube display, a light-emitting diode display (LED), an electroluminescent display (ELD), an electronic paper or e-ink display, a plasma display panel (PDP), a liquid crystal display (LCD), an organic light-emitting diode display (OLED), and/or the like.

The user computing device 102 can include an image capture system 126 that is configured to capture images. The image capture system 126 can include one or more cameras. Each camera can include various components, such as, for example, one or more lenses, an image sensor (e.g., a CMOS sensor or a CCD sensor) an imaging pipeline (e.g., image signal processor), and/or other components.

The camera(s) can be any type of camera positioned according to any configuration. In one example, the device 102 can have multiple forward-facing cameras and/or multiple rearward-facing cameras. The cameras can be narrow angle cameras, wide angle cameras, or a combination thereof. The cameras can have different filters and/or be receptive to different wavelengths of light (e.g., one infrared camera and one visible light spectrum camera). In one example, the device 102 can have a first rearward-facing camera (e.g., with a wide-angle lens and/or f/1.8 aperture), a second rearward-facing camera (e.g., with a telephoto lens and/or f/2.4 aperture), and a frontward-facing camera (e.g., with a wide-angle lens and/or f/2.2 aperture). In another particular example, the device 102 can include the following cameras: a rearward-facing camera (e.g., with 12.2-megapixel, laser autofocus, and/or dual pixel phase detection), a first frontward-facing camera (e.g., with 8.1-megapixel and/or f/1.8 aperture), and a second frontward-facing camera (e.g., with 8.1-megapixel, wide-angle lens, and/or variable f/1.8 and f/2.2 aperture).

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, processed images and/or unprocessed images as training images.

Thus, in some implementations, the model trainer 160 can train new models or update versions on existing models on additional image data. The training data 162 can include images that have been labeled with ground truth measures or one or more attributes of interest. As an example, the model trainer 160 can use images hand-labeled as being desirable to train one or more models to provide outputs regarding the desirability of an input image. In particular, in some implementations, the additional training data can be images that the user created or selected through an editing interface. Thus, updated versions of the models can be trained by model trainer 160 on personalized data sets to better infer, capture, and store images which satisfy the particular visual tastes of the user. In other instances, the additional training data can be anonymized, aggregated user feedback.

Thus, in some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
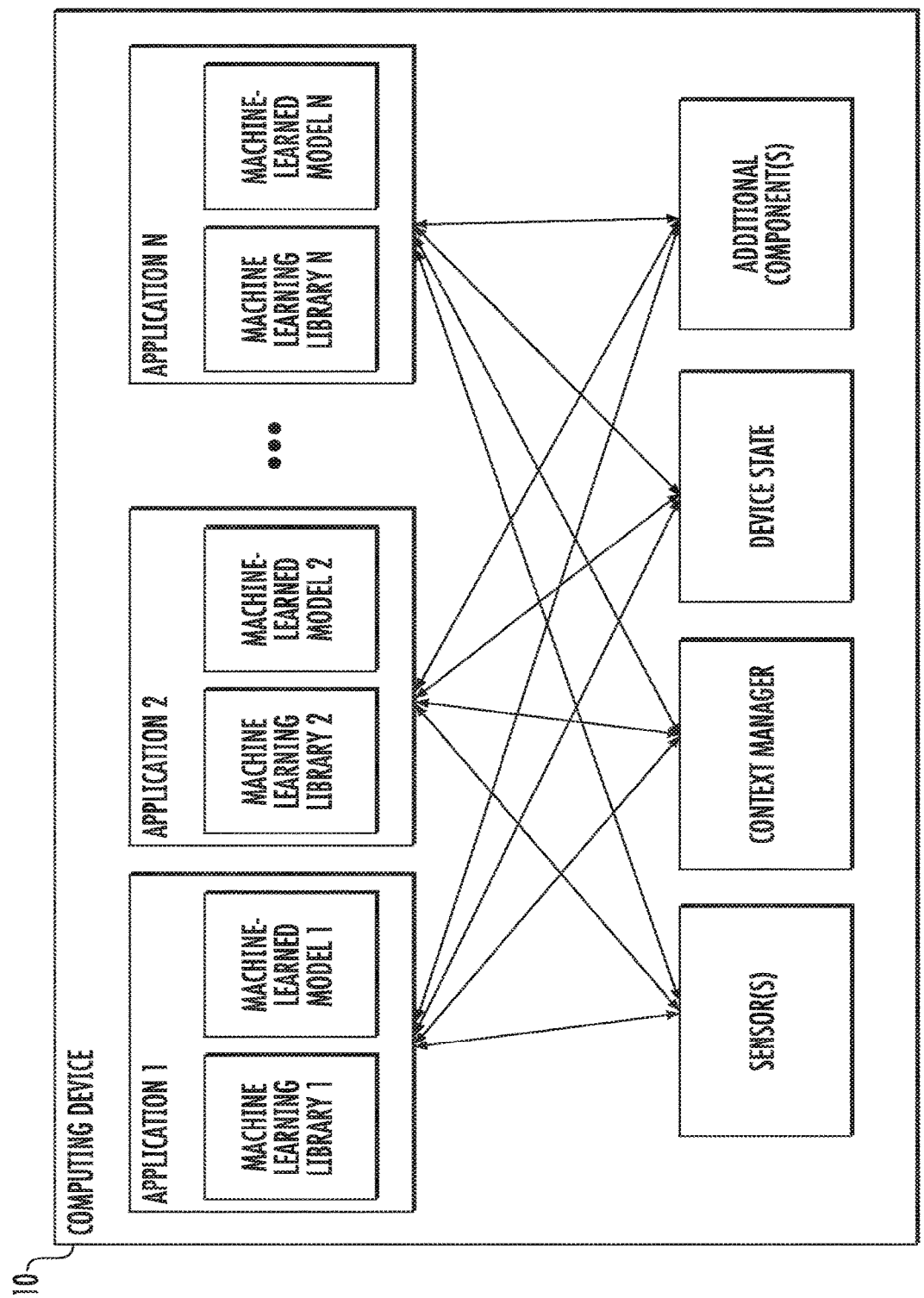
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
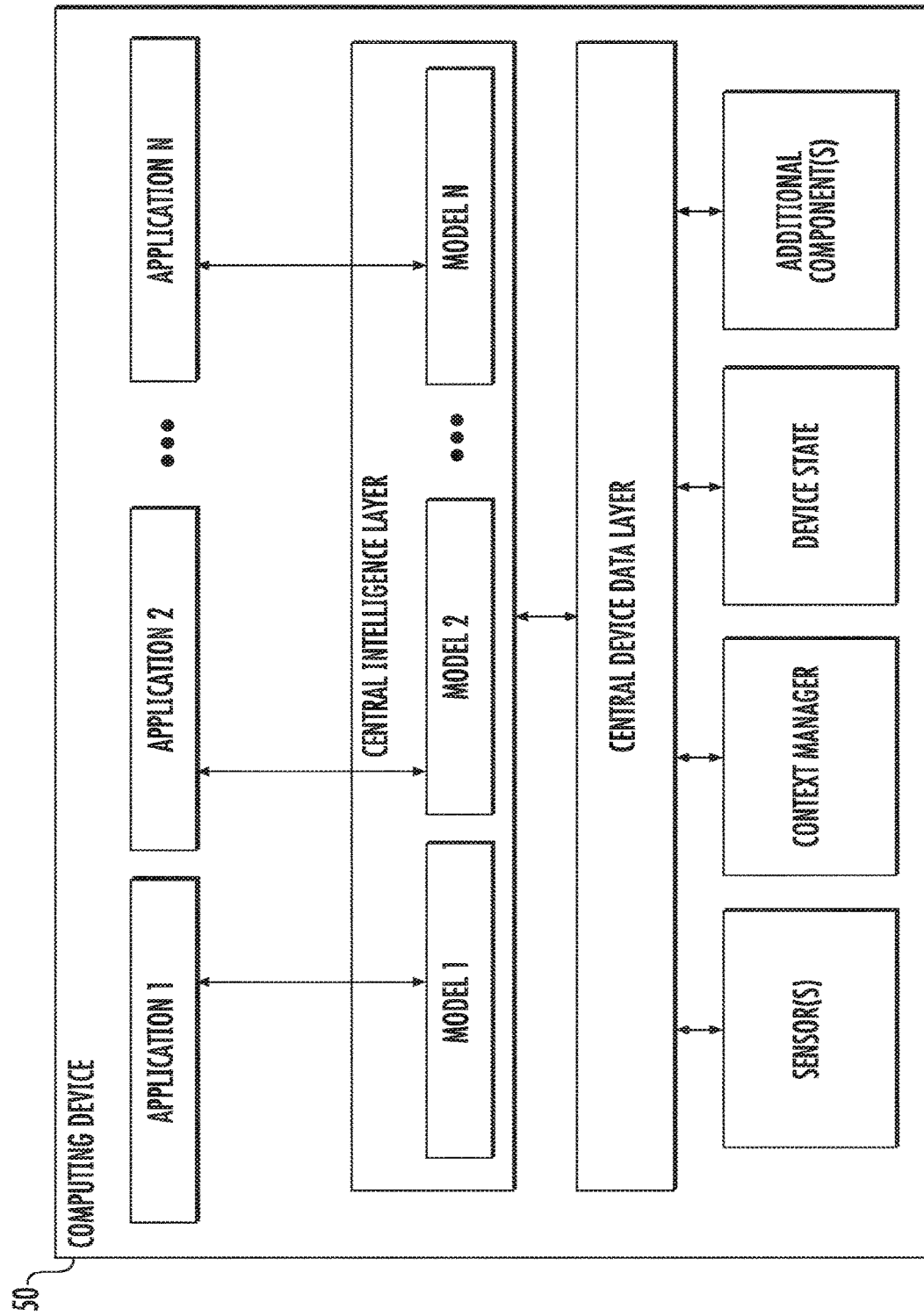
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIG. 2 depicts a schematic of an example image processing framework 200 according to an example embodiment of the present disclosure. In particular, the schematic depicted in FIG. 2 illustrates relationships between components which permit multiple potential data paths or work flows through the framework 200. The image processing framework 200 can be included in the user computing device 102 of FIG. 1A.

FIG. 2 provides one example of an image processing framework, but the present disclosure is not limited to the example provided in FIG. 2. Other configurations of image processing frameworks with more or fewer components and/or differing data flows can be used in accordance with the present disclosure.

Referring to FIG. 2, the image processing framework 200 includes an image sensor 202 which outputs raw image data. For example, the raw image data can be a Bayer RAW image. The raw image data can be communicated to a first memory 204 and/or an imaging pipeline 206. As one example, the first memory 204 which stores the raw image data output by the image sensor 202 can be denominated as a raw temporary data buffer and can be, for example, DRAM memory. In some implementations, the imaging pipeline 206 streams the raw image data directly from the image sensor 202. In such scenario, the temporary data buffer may optionally store processed images instead of the raw image data.

The imaging pipeline 206 takes the raw image data received from the image sensor 202 and processes such raw image data to generate an image. For example, the processed image can be a RGB image, a YUV image, a YCbCr image, or images according to other color spaces. In addition, the imaging pipeline 206 can be operatively connected to a system processor 214. The system processor 214 can include hardware blocks 216 that assist the imaging pipeline 206 in performing Debayer filtering, RAW filtering, LSC filtering, or other image processing operations. The RAW filter stage can provide image statistics 216 for auto exposure in real time and/or auto white balance operations. Software filters optionally may be employed as well.

Depending on the capture mode of the mobile image capture device and/or other parameters, the imaging pipeline 206 can provide the image to an optional scaler 208 or a second memory 222, which will be discussed further below. The scaler 208 can down sample the received image to output a lower resolution version of the image. Thus, in some implementations, the scaler 208 can be denominated as a down sampler.

The scaler 208 provides the image to a third memory 210. The third memory 210 may be the same memory as or a different memory than the second memory 222. The second memory 222 and/or the third memory 210 can store temporary copies of the image. Thus, the second memory 222 and/or the third memory 210 can be denominated as temporary image buffers. In some implementations, the second memory 222 and/or the third memory 210 are DRAM. In addition, in some implementations, downsampling can be performed at the beginning of the imaging pipeline such that the imaging pipeline is enabled to run at a lower resolution and conserve power to a greater degree.

The second memory 222 and/or the third memory 210 can provide the image information to an artificial intelligence system 212. In some implementations, the artificial intelligence system 212 is operable to analyze a scene depicted by the image to assess a desirability of such scene and, based at least in part on such desirability, determine whether to store a non-temporary copy of such image or to discard the temporary copy of such image without further storage. The artificial intelligence system 212 can also access various data 218 stored at the system processor 214.

If the artificial intelligence system 212 determines that a non-temporary copy of the image should be stored, then the artificial intelligence system 212 can provide the image to a compression component 226. In other implementations, the compression component 226 can receive the image from the second memory 222 and/or the third memory 210. In yet other implementations, if the artificial intelligence system determines that a non-temporary copy of the image should be stored, then the raw image data stored in the first memory 204 will be retrieved and processed by the imaging pipeline 206 and the resulting processed image will be provided to the compression component 226.

The compression component 226 compresses the received image. The compression component 226 can be a hardware component or image compression software implemented on a processor (e.g., the system processor 214). After compression, a non-temporary copy of the image is written to a non-volatile memory 228. For example, the non-volatile memory 228 can be an SD card or other type of non-temporary memory.

It should be noted that, in some implementations, the image compression path 220 marked in a dotted box may not be active when an image is not chosen for compression and storage. Thus, in some implementations, the output of the artificial intelligence system 212 can be used to either turn on the image compression path 220 or control the image sensor 202. In particular, the artificial intelligence system 212 (e.g., in partnership with the system processor 214) can provide sensor control signals 230 to control the image sensor 202, as will be discussed further below. Further, in some implementations, the output of the artificial intelligence system 212 can be used to either turn on or off the imaging pipeline path as well. In addition, in some implementations and/or capture modes, portions of the scene analysis can be performed with respect to low-resolution images whereas other portions of the scene analysis can be performed on crops of high-resolution images (e.g., facial expression analysis may require crops of high resolution images).

In some implementations, the output from the image sensor 202 can control most of the timing through the imaging pipeline 206. For example, image processing at the imaging pipeline 206 can be roughly frame-synced to transfer at the image sensor receiver (e.g., an MIPI receiver). Each of the stages of image processing 206 can have some delay which causes the output to be a few image sensor rows behind the input. This delay amount can be constant given the amount of processing that happens in the pipeline 206.

In some implementations, the artificial intelligence system 212 can start shortly after the imaging pipeline 206 has written all the lines of one image to memory. In other implementations, the artificial intelligence system 212 starts even before the imaging pipeline 206 has written all the lines of one image to memory. For example, certain models included in the artificial intelligence system (e.g., a face detector model) can operate on subsets of the image at a time and therefore do not require that all of the lines of the image are written to memory. In some implementations, compression can be performed after the artificial intelligence system 212 determines that the image is worth saving and compressing. In other implementations, instead of analyzing images that have been fully processed by the image processing pipeline 206, the artificial intelligence system 212 can analyze Bayer raw images or images that have only been lightly processed by the imaging pipeline 206.

Figure 3:
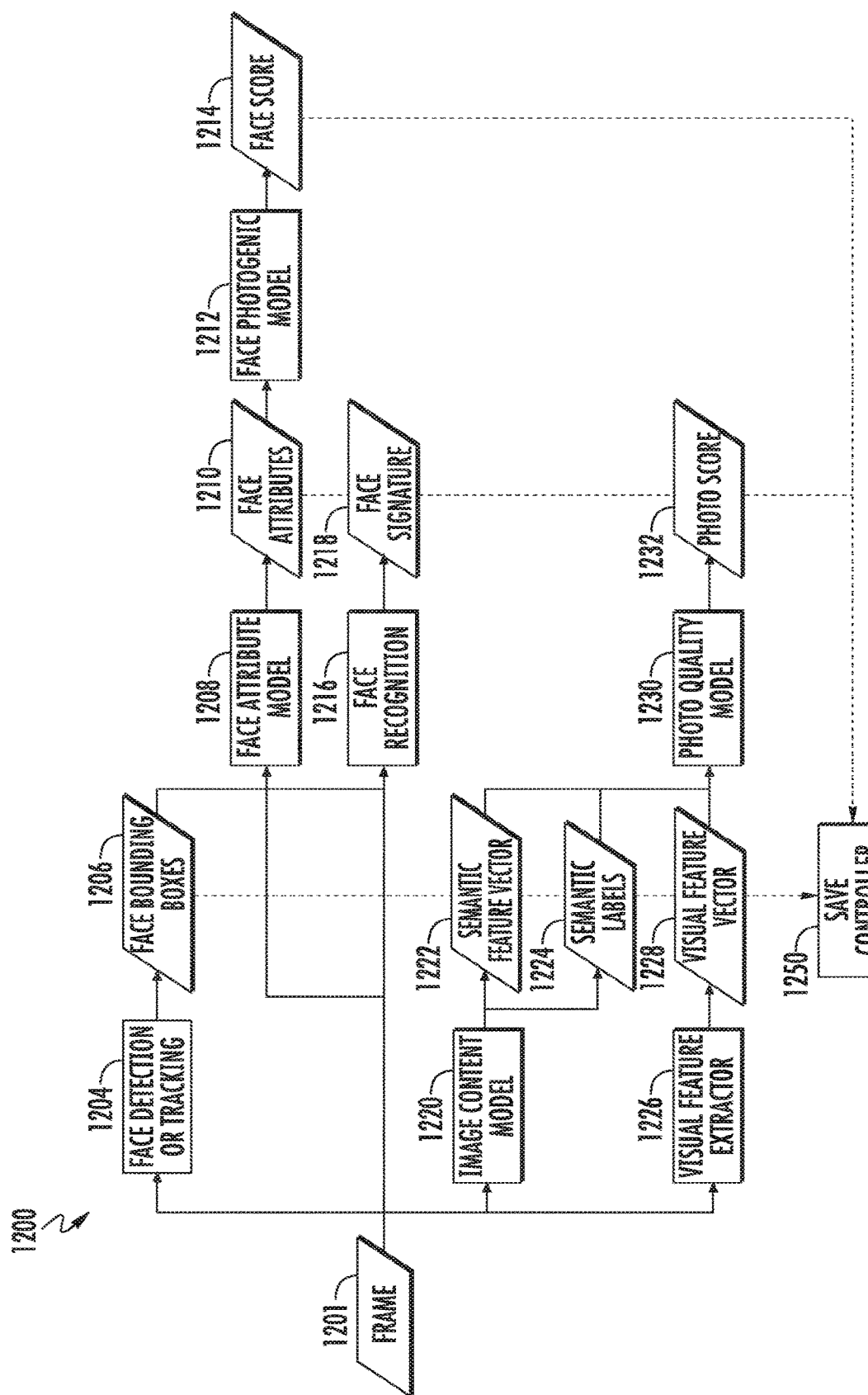
FIG. 3 depicts a diagram of an example artificial intelligence system according to example embodiments of the present disclosure.

FIG. 3 depicts an example configuration 1200 of models in an artificial intelligence system according to an example embodiment of the present disclosure. FIG. 3 depicts different components operating in the artificial intelligence system and the data flow between them. As illustrated, certain portions of the execution can be parallelized.

FIG. 3 provides one example of an artificial intelligence system, but the present disclosure is not limited to the example provided in FIG. 3. Other configurations of an artificial intelligence system with more or fewer components and/or differing data flows can be used in accordance with the present disclosure.

The following discussion with reference to FIG. 3 will refer to various models. In some implementations, one or more (e.g., all) of such models are artificial neural networks (e.g., deep neural networks). Each model can output at least one descriptor that describes a measure of an attribute of the image. The image can be annotated with such descriptor(s). Thus, the outputs of the models will be referred to as annotations. In some implementations, the models provide the annotations to a save controller 1250 which annotates the image with the annotations.

The configuration 1200 receives as input a frame of imagery 1202. For example, the frame 1202 may have been selected by a model scheduler for analysis.

The frame of imagery 1202 is provided to a face detection or tracking model 1204. The face detection or tracking model 1204 detects one or more faces depicted by the frame 1202 and outputs one or more face bounding boxes 1206 that describe the respective locations of the one or more detected faces. The face bounding boxes 1206 can be annotated to the frame 1202 and can also be provided as input alongside the frame 1202 to a face attribute model 1208 and a face recognition model 1216.

In some implementations, the face detection or tracking model 1204 performs face tracking rather than simple face detection. In some implementations, the model 1204 may choose which of detection or tracking to perform. Face tracking is a faster alternative to face detection. Face tracking can take as additional inputs the face detection bounding boxes 1206 from a previous frame of imagery. The face tracking model 1204 updates the position of the bounding boxes 1206, but may not in some instances detect new faces.

Importantly, neither face detection nor face tracking attempt to determine or ascertain a human identity of any of the detected faces. Instead, the face detection or tracking model 1204 simply outputs face bounding boxes 1206 that describe the location of faces within the frame of imagery 1202. Thus, the model 1204 performs only raw detection of a face (e.g., recognition of depicted image features that are "face-like"), without any attempt to match the face with an identity.

The face attribute model 1208 can receive as input one or more crops of the frame of imagery 1202 (e.g., relatively higher resolution crops), where the one or more crops correspond to the portion(s) of the frame 1202 defined by the coordinates of the bounding box(es) 1206. The face attribute model 1208 can output an indication (e.g., a probability) that the detected face(s) include certain face attributes 1210. For example, the face attribute model 1208 can output respective probabilities that the detected faces include smiles, open eyes, certain poses, certain expressions, a diversity of expression, or other face attributes 1210.

The face attributes 1210 can be provided as input alongside the frame of imagery 1202 to a face photogenic model 1212. The face photogenic model 1212 can output a single face score 1214 which represents a level of photogenicness of a pose, an expression, and/or other characteristics or attributes of the detected face(s).

Returning to the output of face detection or tracking model 1204, the face recognition model 1216 can receive as input one or more crops of the frame of imagery 1202 (e.g., relatively higher resolution crops), where the one or more crops correspond to the portion(s) of the frame 1202 defined by the coordinates of the bounding box(es) 1206. The face recognition model 1216 can output a face signature for each of the detected faces. The face signature can be an abstraction of the face such as an embedding or template of the face or features of the face.

Importantly, the face recognition model 1216 does not attempt to determine or ascertain a human identity of the detected face(s). Thus, the face recognition model 1216 does not attempt to determine a name for the face or otherwise match the face to public profiles or other such information. Instead, the face recognition model 1216 simply matches an abstraction of the detected face(s) (e.g., an embedding or other low-dimensional representation) to respective other abstractions associated with previously "recognized" faces. As one example, the face recognition model 1216 may provide a probability (e.g., a level of confidence from 0.0 to 1.0) that an abstraction of a face depicted in an input image matches an abstraction of a face depicted in a previously captured image. Thus, the face recognition model 1216 may indicate (e.g., in the face signature 1218) that a face detected in the image 1202 is likely also depicted in a previously captured image, but does not attempt to identify "who" this face belongs to in the human identity contextual sense.

The frame of imagery 1202 can also be provided as input to an image content model 1220. The image content model 1220 can output one or more semantic feature vectors 1222 and one or more semantic labels 1224. The semantic feature vectors 1222 can be used for determining that two images contain similar content (e.g., similar to how face embeddings are used to determine that two faces are similar). The semantic labels 1224 can identify one or more semantic features (e.g., "dog," "sunset," "mountains," "Eiffel Tower," etc.) detected within the frame of imagery 1202. The notion of similarity between images can be used to ensure a diversity of captured images.

In some implementations, the image content model 1220 is a version of a deep convolutional neural network trained for image classification. In some implementations, a subset of semantic classes that are particularly important to users of the mobile image capture device (e.g., animals, dogs, cats, sunsets, birthday cakes, etc.) can be established and the image content model 1220 can provide a particular emphasis on detection/classification with respect to such subset of semantic classes having elevated importance.

The frame of imagery 1202 can also be provided as input to a visual feature extractor model 1226. The visual feature extractor model 1226 can output one or more visual feature vectors 1228 that describe one or more visual features (e.g., a color histogram, color combinations, an indication of amount of blur, an indication of lighting quality, etc.) of the frame 1202.

The semantic feature vectors 1222, semantic labels 1224, and the visual feature vectors 1228 can be provided as input alongside the frame 1202 to a photo quality model 1230. The photo quality model 1230 can output a photo quality score 1232 based on the inputs. In general, the photo quality model 1230 will determine the photo quality score 1232 on the basis of an interestingness of the image 1202 (e.g., as indicated by the semantic labels 1224), a technical quality of the image 1202 (e.g., as indicated by visual feature vectors 1228 that describe blur and/or lighting), and/or a composition quality of the image 1202 (e.g., as indicated by the relative locations of semantic entities and visual features).

Some or all of the annotations 1206, 1210, 1214, 1218, 1222, 1224, 1228, and 1232 can be measures of attributes of the image frame 1202. In some implementations, some or all of the annotations 1206, 1210, 1214, 1218, 1222, 1224, 1228, and 1232 can be used to generate a single aggregate measure or score for the image frame 1202. In some implementations, the single score can be generated according to a heuristic such as, for example, a weighted average of respective scores provided for the annotations, where the weightings of the weighted average and/or the respective scoring functions for respective annotations can be modified or tuned to score images against a particular photographic goal. In some implementations, the single score can be used to control a feedback indicator that is representative of the single score.

The save controller 1250 can take as input all of the annotations 1206, 1210, 1214, 1218, 1222, 1224, 1228, and 1232 and make a decision whether or not to save the frame of imagery 1202 or a high resolution version thereof. In some implementations, the save controller 1250 will try to save frames that the final curation function will want to select, and hence can be viewed as an online/real-time approximation to such curation function.

In some implementations, the save controller 1250 includes an in-memory annotation index or other frame buffering so that save decisions regarding frame 1202 can be made relative to peer images. In other implementations, the save controller 1250 makes decisions based only on information about the current frame 1202.

In some implementations, and to provide an example only, the save controller 1250 may be designed so that approximately 5% of captured images are selected for compression and storage. In some implementations, whenever the save controller 1250 triggers storage of an image, some window of imagery around the image which triggered storage will be stored.

In some implementations, various ones of the models can be combined to form a multi-headed model. As one example, the face attribute model 1208, the face recognition model 1216, and/or the face photogenic model 1212 can be merged or otherwise combined to form a multi-headed model that receives a single set of inputs and provides multiple outputs.

Configuration 1200 is provided as one example configuration only. Many other configurations of models that are different than configuration 1200 can be used by the artificial intelligence system. In particular, in some implementations, a model scheduler/selector of the artificial intelligence system can dynamically reconfigure the configuration of models to which an image is provided as input.

FIG. 4 depicts a diagram of an example operational state flow according to example embodiments of the present disclosure. As illustrated in FIG. 4, an example device can be toggled between operational states such as a traditional camera mode, a photobooth mode, and a photos gallery mode.

Thus, in some implementations, the photobooth operating mode can be a dedicated mode accessed via a camera application mode switcher. Being a dedicated mode presents the user with an opportunity to choose to participate in temporary auto-capture. In some implementations, exiting photobooth mode and switching back to the main Camera mode can be easy and occur via a single button press.

In some implementations, the transition between the standard camera application and photobooth mode can be seamless and can, for example, be signified by a screen fade to black and/or a brief display of a photobooth icon announcing the mode switch. This transition time can be used to load intelligence models as needed.

In some implementations, when users are in the photobooth mode, the application can provide a real-time viewfinder to help the user frame shots and understand what's "in view" and/or give the user qualitative feedback from camera intelligence to help them understand what the phone "sees."

In some implementations, when users are in photobooth mode, it can be made clear to users in as close to "present" as possible that new clips are being captured so as to provide frequent feedback that the camera capturing.

In some implementations, viewing recent shots can be one interaction (e.g., button press) away, and users can be able to easily delete shots that they don't want. Thumbnails of recent captures can represent those from the current capture session and these thumbnails can be refreshed on each new instance of photobooth mode.

In some implementations, the first time a user launches photobooth mode, the user interface can provide a short tutorial on core concepts, such as: the concept of hands-free capture; briefing on what intelligence "looks for"; recommended usage pattern, such as set down; current scope of permissions; and/or other instructions.

In some implementations, while in photobooth mode, the image capture system can capture motion photos, selecting both an interesting up-to-3s, 30 fps video segment and a single high quality "poster frame." In some implementations, the captured images can include full megapixel output from the front-facing camera sensor for the poster frame, HDR+, and/or 30 fps/720 p video component. The photobooth mode can utilize the standard auto-exposure (AE) and auto-focus (AF) behavior from the mainline camera application, as possible tuning for faces detected in view. In some implementations, various portrait mode effects (e.g., bokeh blur) can be added to captured portrait photographs.

In some implementations, users can configure photo gallery backup & sync settings for content captured in the photobooth mode separately from content in a main directory. One way to do this might be to save photobooth content in a specific device folder while still presenting such content in a main photos tab in the gallery. Users can search for, filter, and segment out clips captured in the photobooth mode in the photos gallery.

In some implementations, users can be able to toggle audio capture on/off from the main screen of photobooth mode and/or from a settings menu. Alternatively or additionally, photobooth mode can inherit mainline camera options.

Example User Interfaces

Figure 5C:
FIGS. 5A-C depict an example user interface according to example embodiments of the present disclosure.
Figure 5B:
Figure 5A:
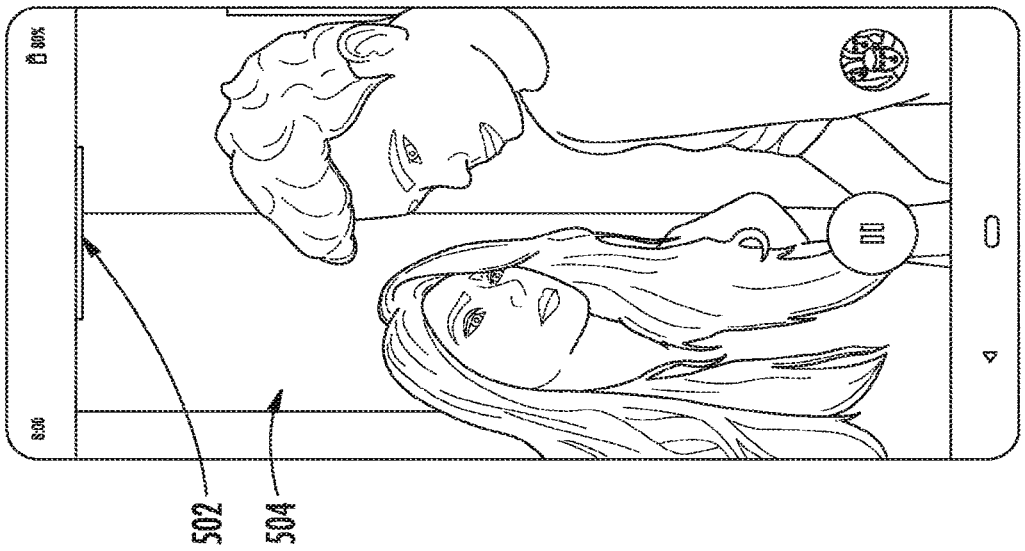

FIGS. 5A-C depict an example user interface according to example embodiments of the present disclosure. The example user interface includes a graphical intelligence feedback indicator 502 at a top edge of a viewfinder portion 504 of the user interface.

As illustrated in FIGS. 5A-C, the graphical intelligence feedback indicator 502 is a graphical bar that is horizontally oriented. In the illustrated example, the graphical intelligence feedback indicator 502 indicates how suitable the presented image frame is for use as a group portrait. In particular, the size of the graphical intelligence feedback indicator 502 is positively correlated to an indicative of a measure of suitability for use as a group portrait that has been output by an artificial intelligence system.

More particularly, as shown in FIG. 5A, neither subject within the depicted scene is looking at the camera. As such, the image is relatively less desirable for satisfying a group portrait photographic goal. Therefore, the size of the graphical intelligence feedback indicator 502 is relatively small.

Turning to FIG. 5B, now one, but not both, of the subjects within the depicted scene is looking at the camera. As such, the image is relatively more desirable for satisfying a group portrait photographic goal. Therefore, the size of the graphical intelligence feedback indicator 502 has been increased relative to FIG. 5A.

Finally, turning to FIG. 5C, now both of the subjects within the depicted scene are looking at the camera. As such, the image is highly suitable for satisfying a group portrait photographic goal. Therefore, the size of the graphical intelligence feedback indicator 502 has been increased again relative to FIG. 5B. In fact, the size of the graphical intelligence feedback indicator 502 in FIG. 5C now fills almost an entirety of a width the user interface. This may indicate that the device is about to or is currently automatically capturing an image. Stated differently, the line can grow to touch the edge of the display when capture occurs.

The example user interface shown in FIGS. 5A-C can also optionally include some or all of the following controls: a link to photo gallery viewer; a motion photos toggle control; zoom controls, user hints, a manual shutter button control, and/or a mode close control.

In some implementations, users can be provided with a simple way to increase or decrease the capture rate of the camera when in the photobooth mode, such as an optional slider setting or alternatively a discrete number of levels. This can be an in-mode user interface that is separate from the native settings of the camera. The slider or other interface feature may be accessed via a settings menu or may be available directly on the main interface screen.

Figure 6A:
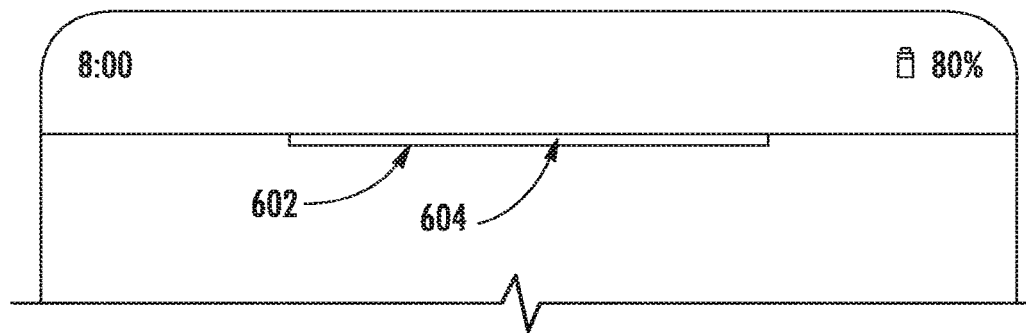
FIGS. 6-A-C depict a first example graphical intelligence feedback indicator according to example embodiments of the present disclosure.
Figure 6B:
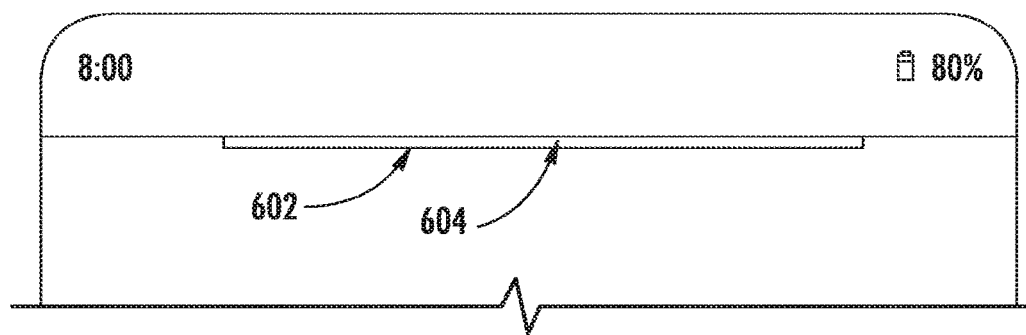
Figure 6C:
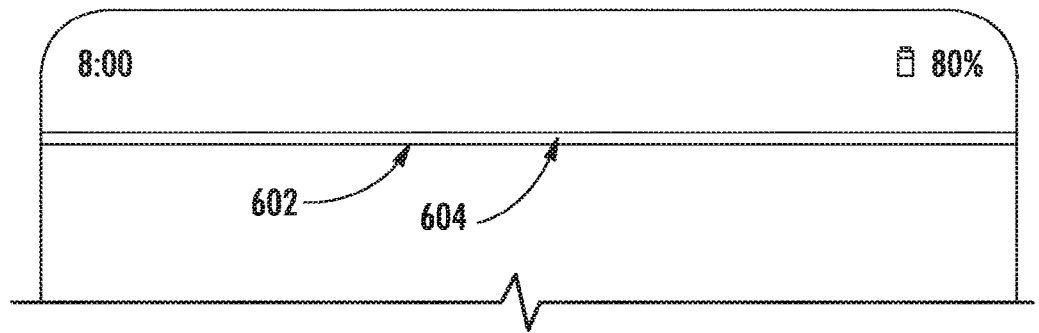

FIGS. 6A-C depict a first example graphical intelligence feedback indicator 602 according to example embodiments of the present disclosure. In particular, the graphical intelligence feedback indicator 602 illustrated in FIGS. 6A-C is highly similar to that shown in FIGS. 5A-C.

As illustrated in FIGS. 6A-C the graphical intelligence feedback indicator 602 is a graphical bar that has a size that is positively correlated to and indicative of the respective measure of the one or more attributes of the respective scene depicted by the image frame currently presented in the viewfinder portion of the user interface. For example, the graphical bar 602 is a horizontal bar at a top edge of the viewfinder portion of the user interface.

The graphical bar 602 has a center point 604 and extends along a horizontal axis. The graphical bar 602 is fixed or pinned at the center point 604 of the graphical bar 602 and increases or decreases in size in both directions from the center point 604 of the graphical bar 602 along the horizontal axis to indicate changes in the respective measure of the one or more attributes of the respective scene depicted by the image frame currently presented in the viewfinder portion of the user interface. In some implementations, the entirety of the shape can be filled when capture is activated. Stated differently, the inner circle can grow to touch the edge of the outer circle when capture occurs.

Figure 7A:
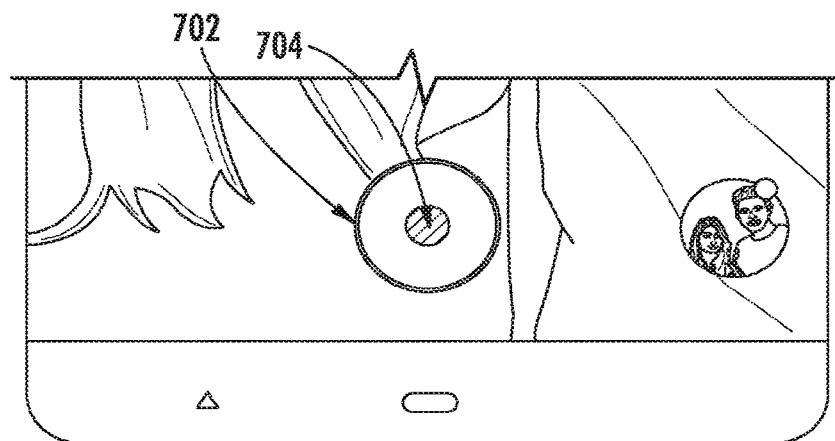
FIGS. 7-A-C depict a second example graphical intelligence feedback indicator according to example embodiments of the present disclosure.
Figure 7B:
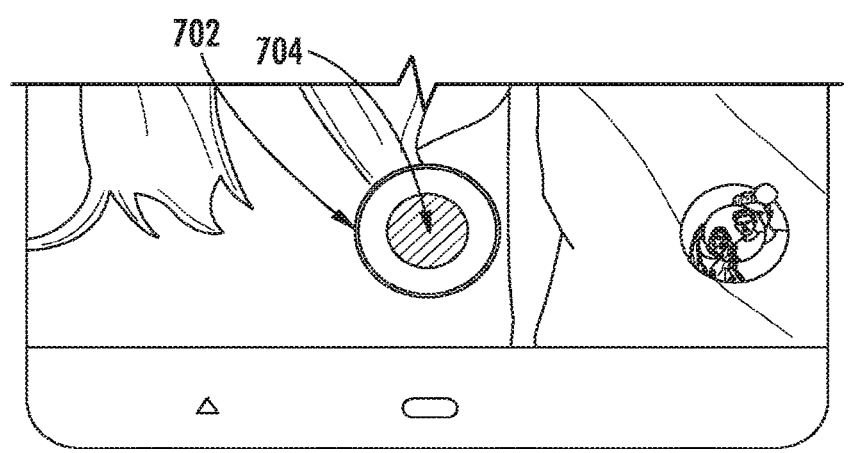
Figure 7C:
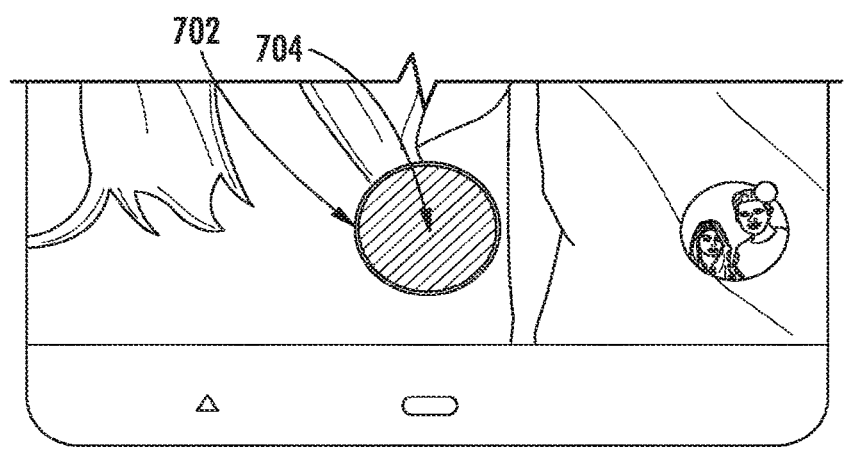

FIGS. 7-A-C depict a second example graphical intelligence feedback indicator 702 according to example embodiments of the present disclosure. The graphical intelligence feedback indicator 702 is a graphical shape, which in the illustrated example is a circle. An amount of the graphical shape 702 that is filled is positively correlated to and indicative of the respective measure of the one or more attributes of the respective scene depicted by the image frame currently presented in the viewfinder portion of the user interface.

The graphical shape (e.g., circle) 702 can have a center point 704. The amount of the graphical shape (e.g., circle) 702 that is filled increases and decreases radially from the center point 704 of the shape 702 toward a perimeter of the shape 702 to indicate changes in the respective measure of the one or more attributes of the respective scene depicted by the image frame currently presented in the viewfinder portion of the user interface.

Figure 8:
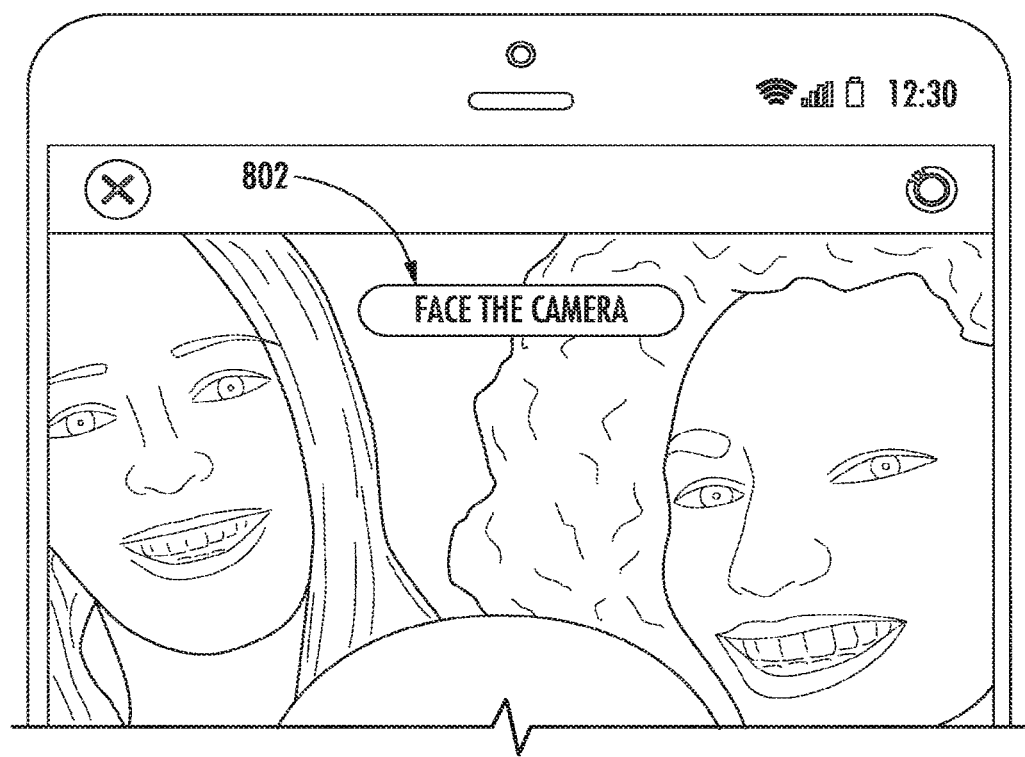
FIG. 8 depicts a third example graphical intelligence feedback indicator according to example embodiments of the present disclosure.

FIG. 8 depicts a third example graphical intelligence feedback indicator 802 according to example embodiments of the present disclosure. The indicator 802 provides textual feedback. For example, the textual feedback can provide one or more suggestions (e.g., "Face the Camera") to improve the measure of the one or more attributes of the respective scene. In some instances, the one or more suggestions can be generated by the artificial intelligence system or based on output of the artificial intelligence system. Additional example suggestions include "hold the camera still", "it's too dark", "I don't see any faces", "the flash is turned off" (or on), "there's not enough light", "try different lighting", "try a different expression", "move camera farther away", "reduce backlighting", and/or other suggestions. For example, the suggestions can be descriptive of a primary reason why the artificial intelligence is not capturing an image or otherwise providing the image with a relatively lower score.

Example Methods

Figure 9:
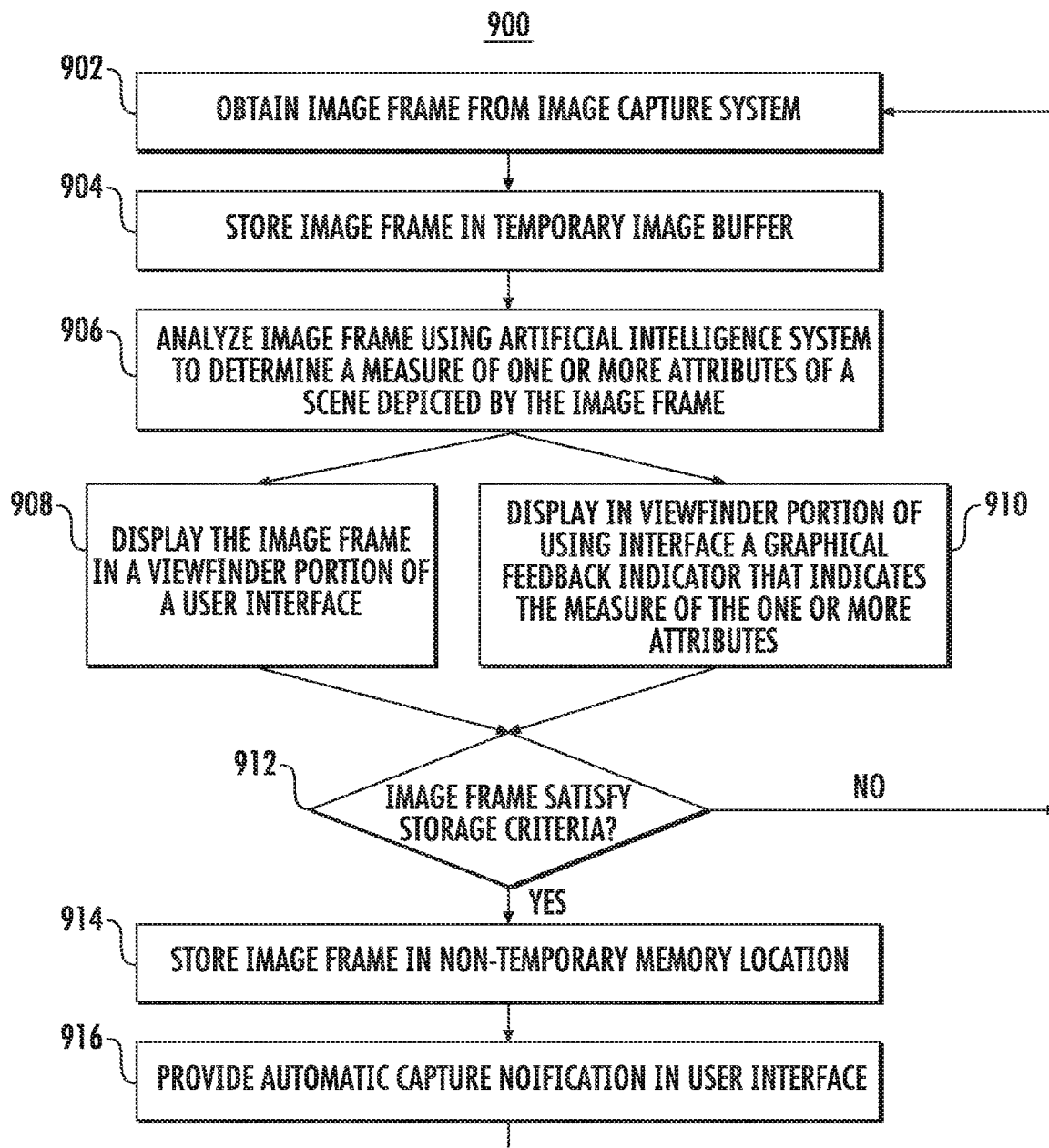
FIG. 9 depicts a flow chart diagram of an example method according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various portions of the method 900 can be omitted, rearranged, combined, and/or adapted in various ways without deviating from the scope of the present disclosure. For example, whether illustrated as such or not, various portions of the method 900 can be performed in parallel.

At 902, a computing system obtains an image frame from an image capture system.

At 904, the computing system stores the image frame in a temporary image buffer.

At 906, the computing system analyzes the image frame using an artificial intelligence system to determine a measure of one or more attributes of a scene depicted by the image frame.

At 908, the computing system displays the image frame in a viewfinder portion of a user interface.

At 910, concurrently with 908, the computing system displays in the viewfinder portion of the user interface a graphical feedback indicator that indicates the measure of the one or more attributes of the image frame currently displayed in the viewfinder portion of the user interface.

At 912, the computing system determines whether the image frame satisfies one or more storage criteria. For example, the measure of the one or more attributes can be compared to the one or more criteria, which may, for example, take the form of threshold scores or conditions that must be met. In one particular example, images can satisfy storage criteria if a certain percentage (e.g., >50%) of faces in the scene are exhibiting positive facial expressions. In another example, if more than a certain number (e.g., 3) of faces included in the scene are exhibiting positive facial expressions, then the criteria can be considered satisfied.

If it is determined at 912 that the image frame does not satisfy the storage criteria, then method 900 can return to 902 and obtain the next image frame in a stream of image frames from the image capture system.

However, if it is determined at 912 that the image frame does satisfy the storage criteria, then method 900 can proceed to 914.

At 914, the computing system can store the image frame in a non-temporary memory location.

At 916, the computing system can provide an automatic capture notification in the user interface.

After 916, method 900 can return to 902 and obtain the next image frame in a stream of image frames from the image capture system.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
an image capture system configured to capture a plurality of image frames;
an artificial intelligence system comprising one or more machine-learned models, the artificial intelligence system configured to analyze each of the plurality of image frames and to output, for each of the plurality of image frames, a respective measure of one or more attributes of a respective scene depicted by the image frame;
a display;
one or more processors; and
one or more non-transitory computer-readable media that store instructions that, when executed by the one or more processors, cause the one or more processors to perform operations, the operations comprising:
providing, in a viewfinder portion of a user interface presented on the display, a live video stream that depicts at least a portion of a current field of view of the image capture system, wherein the live video stream comprises the plurality of image frames; and providing, in the viewfinder portion of the user interface presented on the display, a graphical intelligence feedback indicator in association with the live video stream, the graphical intelligence feedback indicator graphically indicating, for each of the plurality of image frames as such image frame is presented within the viewfinder portion of the user interface, the respective measure of the one or more attributes of the respective scene depicted by the image frame output by the artificial intelligence system;

wherein the graphical intelligence feedback indicator comprises a graphical bar that has a size that is positively correlated to and indicative of the respective measure of the one or more attributes of the respective scene depicted by the image frame currently presented in the viewfinder portion of the user interface.

2. The computing system of claim 1, wherein the graphical bar comprises a horizontal bar at a bottom edge or a top edge of the viewfinder portion of the user interface.

3. The computing system of claim 1, wherein the graphical bar has a center point and extends along a first axis, and wherein the graphical bar is fixed at the center point of the graphical bar and increases or decreases in size in both directions from the center point of the graphical bar along the first axis to indicate changes in the respective measure of the one or more attributes of the respective scene depicted by the image frame currently presented in the viewfinder portion of the user interface.

4. The computing system of claim 1, wherein the graphical intelligence feedback indicator comprises a graphical shape and wherein an amount of the graphical shape that is filled with the graphical bar is positively correlated to and indicative of the respective measure of the one or more attributes of the respective scene depicted by the image frame currently presented in the viewfinder portion of the user interface.

5. The computing system of claim 1, wherein the graphical intelligence feedback indicator comprises a meter that indicates a proximity of the artificial intelligence system to automatic capture and non-temporary storage of imagery.

6. The computing system of claim 1, wherein the respective measure of the one or more attributes of the respective scene depicted by each image frame comprises:

a respective measure of one or more attributes of use of the respective scene as a self-portrait photograph; or a respective measure of one or more attributes of use of the respective scene as a group photograph.

7. The computing system of claim 1, wherein the respective measure of the one or more attributes of the respective scene depicted by each image frame comprises a respective measure of one or more attributes of use of the respective scene as a group photograph.

8. The computing system of claim 1, wherein the computing system consists of a mobile computing device that includes the image capture system, the artificial intelligence system, the display, the one or more processors, and the one or more non-transitory computer-readable media.

9. The computing system of claim 8, wherein the mobile computing device comprises a smartphone and the image capture system comprises a forward-facing camera that faces in a same direction as the display.

10. The computing system of claim 1, wherein the one or more machine-learned models comprise one or more of:

a machine-learned pose detection model; or a machine-learned facial expression model.

11. The computing system of claim 1, wherein the presence of one or more of the following in the respective scene results in an increase in the respective measure of the one or more attributes of the respective scene output by the artificial intelligence system:

front facing faces;

posing faces;

faces with smiling facial expressions;

faces with eyes open;

faces with frontal gaze; or faces with unusual facial expressions.

12. The computing system of claim 1, wherein the operations further comprise:

receiving a user input that requests operation of the computing system in a photobooth mode; and in response to the user input, operating the computing system in the photobooth mode, wherein said providing, in the viewfinder portion of the user interface presented on the display, the graphical intelligence feedback indicator in association with the live video stream is performed as part of the photobooth mode.

13. The computing system of claim 1, wherein the graphical intelligence feedback indicator graphically indicates, for each of the plurality of image frames as such image frame is presented within the viewfinder portion of the user interface, a relative measure of the one or more attributes of the respective scene depicted by the image frame relative to the previous respective measures of the one or more attributes of respective image frames that have previously been presented within the viewfinder portion of the user interface.

14. The computing system of claim 1, wherein the operations are performed in real-time as the image capture system captures the plurality of image frames.

15. The computing system of claim 1, wherein the one or more attributes of the respective scene depicted by each image frame comprises a desirability of the respective scene depicted by each image frame or whether content depicted in the respective scene satisfies a photographic goal.

16. The computing system of claim 1, wherein the one or more attributes of the respective scene depicted by each image frame comprises whether content depicted in the respective scene satisfies a photographic goal.

17. A computer-implemented method, the method comprising:

obtaining, by one or more computing devices, a real-time image stream comprising a plurality of image frames;

analyzing, by the one or more computing devices using one or more machine-learned models, each of the plurality of image frames to determine a respective image quality indicator that describes whether content depicted in the respective image frame satisfies a photographic goal; and providing, by the one or more computing devices, a feedback indicator for display in association with the real-time image stream in a user interface, wherein the feedback indicator indicates the respective image quality indicator for each image frame while such image frame is presented in the user interface;

wherein the feedback indicator comprises a graphical bar that has a size that is positively correlated to and indicative of the image quality indicator of the respective scene depicted by the image frame currently presented in the viewfinder portion of the user interface.

18. The computer-implemented method of claim 17, further comprising:
selecting, by the one or more computing devices, at least one of the plurality of image frames for non-temporary storage based at least in part its respective image quality indicator.

19. The computer-implemented method of claim 17, wherein the photographic goal comprises a self-portrait or a group portrait.

20. A computing system, comprising:
an image capture system configured to capture a plurality of image frames;
an artificial intelligence system comprising one or more machine-learned models, the artificial intelligence system configured to analyze each of the plurality of image frames and to output, for each of the plurality of image frames, a respective measure of one or more attributes of a respective scene depicted by the image frame;
a display;
one or more processors; and
one or more non-transitory computer-readable media that store instructions that, when executed by the one or more processors, cause the one or more processors to perform operations, the operations comprising:
providing, in a viewfinder portion of a user interface presented on the display, a live video stream that depicts at least a portion of a current field of view of the image capture system, wherein the live video stream comprises the plurality of image frames; and
providing an intelligence feedback indicator in association with the live video stream, the intelligence feedback indicator indicating, for each of the plurality of image frames as such image frame is presented within the viewfinder portion of the user interface, the respective measure of the one or more attributes of the respective scene depicted by the image frame output by the artificial intelligence system;
wherein the graphical intelligence feedback indicator comprises a graphical bar that has a size that is positively correlated to and indicative of the respective measure of the one or more attributes of the respective scene depicted by the image frame currently presented in the viewfinder portion of the user interface.

* * * * *